(12) United States Patent
Brown et al.

(10) Patent No.: US 10,740,203 B2
(45) Date of Patent: Aug. 11, 2020

(54) AGGREGATION OF UPDATED TRACKS TO BE COPIED TO A BACKUP VOLUME FOR PHYSICALLY CONTIGUOUS STORAGE ON A RAID STRIDE

(71) Applicant: INTERNATIONAL BUSINESS MACHINES CORPORATION, Armonk, NY (US)

(72) Inventors: Theresa M. Brown, Tucson, AZ (US); Kevin Lin, Pima, AZ (US); Dave Fei, Tucson, AZ (US); Gail Spear, Tucson, AZ (US); Clint A. Hardy, Tucson, AZ (US); Karl A. Nielsen, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 155 days.

(21) Appl. No.: 16/123,660

(22) Filed: Sep. 6, 2018

(65) Prior Publication Data
US 2020/0081808 A1 Mar. 12, 2020

(51) Int. Cl.
*G06F 11/00* (2006.01)
*G06F 11/20* (2006.01)
*G06F 12/02* (2006.01)
*G06F 11/10* (2006.01)

(52) U.S. Cl.
CPC ...... *G06F 11/2082* (2013.01); *G06F 11/1076* (2013.01); *G06F 11/2094* (2013.01); *G06F 12/0246* (2013.01); *G06F 2212/7201* (2013.01); *G06F 2212/7207* (2013.01)

(58) Field of Classification Search
CPC ............. G06F 11/2082; G06F 11/1076; G06F 11/2094
See application file for complete search history.

(56) References Cited

U.S. PATENT DOCUMENTS

| | | | | |
|---|---|---|---|---|
| 5,146,588 A * | 9/1992 | Crater | ................. | G06F 11/1008 714/6.1 |
| 5,239,659 A * | 8/1993 | Rudeseal | .............. | G06F 3/0601 703/24 |
| 5,371,882 A * | 12/1994 | Ludlam | ............... | G06F 11/2094 714/6.32 |
| 5,394,532 A * | 2/1995 | Belsan | .................. | G06F 3/0601 711/113 |
| 5,396,620 A * | 3/1995 | Burghart | ............... | G06F 3/0601 714/6.32 |
| 5,404,361 A * | 4/1995 | Casorso | .............. | G06F 11/1076 714/52 |

(Continued)

OTHER PUBLICATIONS

U.S. Appl. No. 15/611,569, filed Jun. 1, 2017.

(Continued)

*Primary Examiner* — Katherine Lin
(74) *Attorney, Agent, or Firm* — Konrad Raynes Davda & Victor LLP; Rabindranath Dutta

(57) ABSTRACT

A plurality of tracks that are to be copied to a backup volume are aggregated in a container data structure. The plurality of tracks are stored physically contiguously in a single Redundant Array of Independent Disks (RAID) stride. Mapping metadata is updated in the backup volume to indicate how logical tracks of the backup volume correspond to physical tracks stored in the RAID stride.

20 Claims, 8 Drawing Sheets

(56) References Cited

U.S. PATENT DOCUMENTS

| | | | |
|---|---|---|---|
| 5,410,667 A * | 4/1995 | Belsan | G06F 3/0601 707/999.202 |
| 5,430,855 A * | 7/1995 | Walsh | G06F 3/0601 703/23 |
| 5,459,857 A * | 10/1995 | Ludlam | G06F 11/2071 714/6.12 |
| 6,567,888 B2 | 5/2003 | Kedem | |
| 7,543,110 B2 | 6/2009 | Stolowitz | |
| 8,010,495 B1 | 8/2011 | Kuznetzov et al. | |
| 8,055,938 B1 | 11/2011 | Chatterjee et al. | |
| 8,533,397 B2 | 9/2013 | Bar-El et al. | |
| 8,549,225 B2 | 10/2013 | Blinick et al. | |
| 8,713,272 B2 | 4/2014 | Agombar et al. | |
| 8,850,106 B2 | 9/2014 | Benhase et al. | |
| 8,938,428 B1 | 1/2015 | Ozekinci et al. | |
| 9,471,499 B2 | 10/2016 | Brown et al. | |
| 9,558,072 B1 | 1/2017 | Mam | |
| 9,600,375 B2 | 3/2017 | Dain et al. | |
| 9,600,377 B1 | 3/2017 | Cohen et al. | |
| 9,626,115 B2 | 4/2017 | Dain et al. | |
| 9,658,798 B2 | 5/2017 | Ash et al. | |
| 9,733,862 B1 | 8/2017 | Klemm et al. | |
| 9,817,724 B2 | 11/2017 | Dain et al. | |
| 9,852,198 B1 | 12/2017 | Kuznetzov et al. | |
| 9,857,962 B2 | 1/2018 | Yui et al. | |
| 9,857,996 B2 | 1/2018 | Wilkinson | |
| 9,927,980 B1 | 3/2018 | LeCrone et al. | |
| 10,013,361 B2 | 7/2018 | Mannenbach et al. | |
| 2005/0071372 A1 | 3/2005 | Bartfai et al. | |
| 2005/0171979 A1 | 8/2005 | Stager et al. | |
| 2006/0106891 A1 | 5/2006 | Mahar et al. | |
| 2008/0155216 A1 | 6/2008 | Shoham | |
| 2008/0222377 A1 | 9/2008 | Wightwick et al. | |
| 2012/0284228 A1 * | 11/2012 | Ghosh | G06F 11/2038 707/615 |
| 2014/0108756 A1 | 4/2014 | Brown et al. | |
| 2014/0344526 A1 | 11/2014 | Brown et al. | |
| 2015/0081628 A1 | 3/2015 | Brown et al. | |
| 2015/0261678 A1 | 9/2015 | Gupta et al. | |
| 2015/0286424 A1 | 10/2015 | Dain et al. | |
| 2015/0286432 A1 | 10/2015 | Dain et al. | |
| 2015/0286542 A1 | 10/2015 | Dain et al. | |
| 2016/0232102 A1 | 8/2016 | Ash et al. | |
| 2016/0253121 A1 | 9/2016 | Guo et al. | |
| 2016/0259574 A1 | 9/2016 | Carpenter et al. | |
| 2016/0291890 A1 | 10/2016 | Jennas et al. | |
| 2017/0153950 A1 | 6/2017 | Iwasaki et al. | |
| 2017/0161153 A1 | 6/2017 | Dain et al. | |
| 2017/0177443 A1 | 6/2017 | Figueroa et al. | |
| 2018/0136874 A1 | 5/2018 | Karve et al. | |
| 2018/0150229 A1 | 5/2018 | Brown et al. | |

OTHER PUBLICATIONS

U.S. Appl. No. 15/663,727, filed Jul. 29, 2017.
U.S. Appl. No. 15/828,288, filed Nov. 30, 2017.
U.S. Appl. No. 15/828,302, filed Nov. 30, 2017.
Anonymous, "Data Aware Optimized Backups—Object & System Level", dated Jun. 2, 2016, An IP.com Prior Art Database Technical Disclosure, IPCOM000246384D, Total 7 pages.
Anonymous, "Method for Enhanced Application Performance During FlashCopy Restore in Multi-tier Storage Environment", dated Nov. 28, 2017, An IP.com Prior Art Database Technical Disclosure, IPCOM000251706D, Total 8 pages.
Anonymous, "Tweak Modification to Improve Reliability and Durability in an Encrypted Flash Based Back-Up System" dated Jan. 25, 2017, An IP.com Prior Art Database Technical Disclosure, IPCOM000248984D, Total 4 pages.
Azagury et al.; "Point-In-Time Copy: Yesterday, Today and Tomorrow", IBM Storage Systems Group, 2002, pp. 259-270.
Brooks et al., "IBM Tivoli Storage Manager for Advanced Copy Services" dated Dec. 2006, International Technical Support Organization, Total 318 pages.
Dufrasne et al., "IBM DS8880 Architecture and Implementation (Release 8.3)", IBM, Nov. 2017, Total 510 pp.
Emc et al.; "Introduction to XtremIO Virtual Copies", White Paper, Part No. H13035-01 (Rev. 02), Mar. 2016, pp. 1-39.
IBM, "Data Protection Manager for Exchange 2010 and the IBM® Storwize® V7000 with SAN Based Replica Creation and Recovery" Installation and Configuration Guide, dated Jul. 2011, Version: 2.7.4,Total 44 pages.
Lim, S. et al., "Efficient Journaling Writeback Schemes for Reliable and High-Performance Storage Systems", Pers Ubiquit Comput, 17, 2013, 14 pp.
Mell, P. and T. Grance, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.
Mell, P. and T. Grance, "The NIST Definition of Cloud Computing (Draft)", Sep. 2011, Computer Security Division Information Technology Laboratory National Institute of Standards and Technology, Total 7 pp.
Taylor, Chris; "Effective Backups: Selecting the Right Backup Mechanism to Match the Business Requirement", Session 16273, pp. 1-62, 2014.
Wikipedia, "Binary Search Algorithm", [online], edited on Aug. 14, 2018. Retrieved from the Internet at: <URL: https://en.wikipedia.org/w/index.php?title=Binary_search_algorithm&oldid=854879077>, Total 8 pp.
Wu, et al., "LDM: Log Disk Mirroring with Improved Performance and Reliability for SSD-Based Disk Arrays", ACM Transactions on Storage, vol. 12, No. 4, Article 22, May 2016, 21 pp.
Yang et al.; "TRAP-Array: A Disk Array Architecture Providing Timely Recovery to Any Point-in-time," 33rd International Symposium on Computer Architecture (ISCA'06), Boston, MA, 2006, pp. 289-301.
U.S. Appl. No. 16/123,412, filed Sep. 6, 2018.
U.S. Appl. No. 16/123,674, filed Sep. 6, 2018.
U.S. Appl. No. 16/123,457, filed Sep. 6, 2018.
U.S. Appl. No. 16/123,618, filed Sep. 6, 2018.
U.S. Appl. No. 16/123,486, filed Sep. 6, 2018.
U.S. Appl. No. 16/123,771, filed Sep. 6, 2018.
U.S. Appl. No. 16/123,445, filed Sep. 6, 2018.

* cited by examiner

AGGREGATION OF UPDATED TRACKS TO BE COPIED TO A BACKUP VOLUME FOR PHYSICALLY CONTIGUOUS STORAGE ON A RAID STRIDE

BACKGROUND

1. Field

Embodiments relate to the aggregation of updated tracks to be copied to a backup volume for physically contiguous storage on a Redundant Array of Independent Disks (RAID) stride.

2. Background

In certain storage system environments, a storage controller (or a storage controller complex) may comprise a plurality of storage servers that are coupled to each other. The storage controller allows host computing systems to perform input/output (I/O) operations with storage devices controlled by the storage controller, where the host computing systems may be referred to as hosts.

One or more storage controllers may be used to perform data mirroring by copying data from production volumes to backup volumes for business continuity and disaster recovery. In the event of data loss in production volumes, the backup volumes may be used to recover the data.

Certain types of data mirroring may provide data replication via one or more storage controllers between a production volume and a backup volume. Such mirroring may replicate the data of the production volume in the backup volume while forming consistency groups at a regular intervals to allow a clean recovery of data. Once consistency groups are formed, a point-in-time copy operation is performed to copy from a production volume to a backup volume. A point-in-time copy is a fully usable copy of a defined collection of data that contains an image of the data as it appeared at a single point-in-time. The copy is considered to have logically occurred at that point-in-time. Further details of a storage controller that performs storage management tasks including mirroring, point-in-time copies, and consistency group formations may be found in the publication "IBM DS8880 Architecture and Implementation (Release 8.3)," published November 2017, by International Business Machines Corporation.

Redundant Array of Independent Disks (RAID) is a data storage virtualization technology that combines multiple physical disk drive components into one or more logical units for the purposes of data redundancy, performance improvement, or both. Data is distributed across the storage drives in one of several ways, referred to as RAID levels, depending on the required level of redundancy and performance. The different schemes, or data distribution layouts, are named by the word "RAID" followed by a number, for example RAID 0, RAID 1, RAID 6, etc. Many RAID levels employ an error protection scheme called "parity". For example, RAID 6 include block-level striping with double distributed parity, where the double distributed parity provides fault tolerance for up to two failed drives. The stride of a RAID array hold a number of tracks based on the chunk size of the RAID array and the block size of a file system.

Summary of the Preferred Embodiments

Provided are a method, system, and computer program product in which a plurality of tracks that are to be copied to a backup volume are aggregated in a container data structure. The plurality of tracks are stored physically contiguously in a single Redundant Array of Independent Disks (RAID) stride. Mapping metadata is updated in the backup volume to indicate how logical tracks of the backup volume correspond to physical tracks stored in the RAID stride. As a result, the number of drive operations for performing safeguarded copy operations is reduced.

In additional embodiments, the plurality of tracks aggregated in the container data structure is numerically equal to a maximum number of tracks that can be stored in the RAID stride. As a result, maximum usage is made of the storage capacity of the RAID stride while copying data, while at the same time reducing the number of drive operations by aggregating the writing of the plurality of tracks.

In further embodiments, the storing of the plurality of tracks in the RAID stride comprises writing new data comprising data in the plurality of tracks to the RAID stride including updated parity. As a result, drive operations are reduced in number.

In additional embodiments, the processing time needed for aggregating the plurality of tracks and storing the plurality of tracks physically contiguously in the single RAID stride is less than the time needed for storing each of the plurality of tracks individually in a plurality of RAID strides via a plurality of operations that each comprise reading old data and old parity and writing new data and new parity. As a result, the speed of safeguarded copy operations is increased.

In certain embodiments, tracks are updated randomly on a production volume from which tracks are copied to the backup volume, wherein copying of the tracks that are updated on the production volume are performed sequentially to the backup volume. As a result, logical tracks are may be non-contiguous on the backup volume.

In further embodiments, a plurality of container data structures are maintained for a plurality of RAID arrays, wherein each container data structure stores tracks corresponding to a stride of a RAID array, and wherein at least two container data structures aggregate a different number of tracks. As a result, container data structures may be used in parallel to improve drive operations.

In yet further embodiments, the plurality of container data structures are populated with tracks via a round robin mechanism. As a result, container data structures may be filled in parallel to improve drive operations.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

When copying data from a production volume to a backup volume in a storage controller, in certain types of copy mechanisms referred to as a "safeguarded copy function", tracks are copied into the backup volume in the order requested by a destage and "copy source to target" (CST) process, i.e., tracks are copied sequentially. This may result in tracks that may or may not be logically contiguous to be copied to the backup volume in a set of physically contiguous tracks. Normally tracks that are not logically contiguous are copied (destaged) individually. This may be very inefficient in certain situations when writing to certain types and configurations of RAID arrays, such as in the case of a single track on a RAID-5 array in which every write may require 4 disk operations (i.e., read old data, read old parity, write new data, write new parity). In general in at least RAID-5 and RAID-6 configurations, any write that is less than a full stride may require reading the old data and old parity. The old data and old parity may be comprised of multiple drives each. It then requires a write of the new data and new parity to the same drives involved. For example a single track update in RAID-6 would need 6 disk operations because there are two parity drives. In certain embodiments, it is much more efficient to write a group of physically contiguous tracks in a full "stride" or parity rotation. In such embodiments, a group of tracks (e.g. 24 or 28) may be written with one operation, and then the parity may be updated with one operation (i.e., no reading of old data or old parity is necessary).

In certain embodiments, in order to avoid the RAID penalty of writing single tracks or whenever writing anything less than a full stride, the safeguarded copy function may use a container data structure to aggregate logically random tracks into a group, and then write the entire group of tracks to physically contiguous space. It should be noted that the RAID penalty may occur whenever writing is performed to less than a full stride, and the embodiments avoid the RAID penalty. The backup volume may include metadata that points to the location of each track of the group of tracks. As a result, technological improvements are made to a storage controller for increasing the speed at which data is written to RAID arrays in a safeguarded copy function.

Exemplary Embodiments

Figure 1:
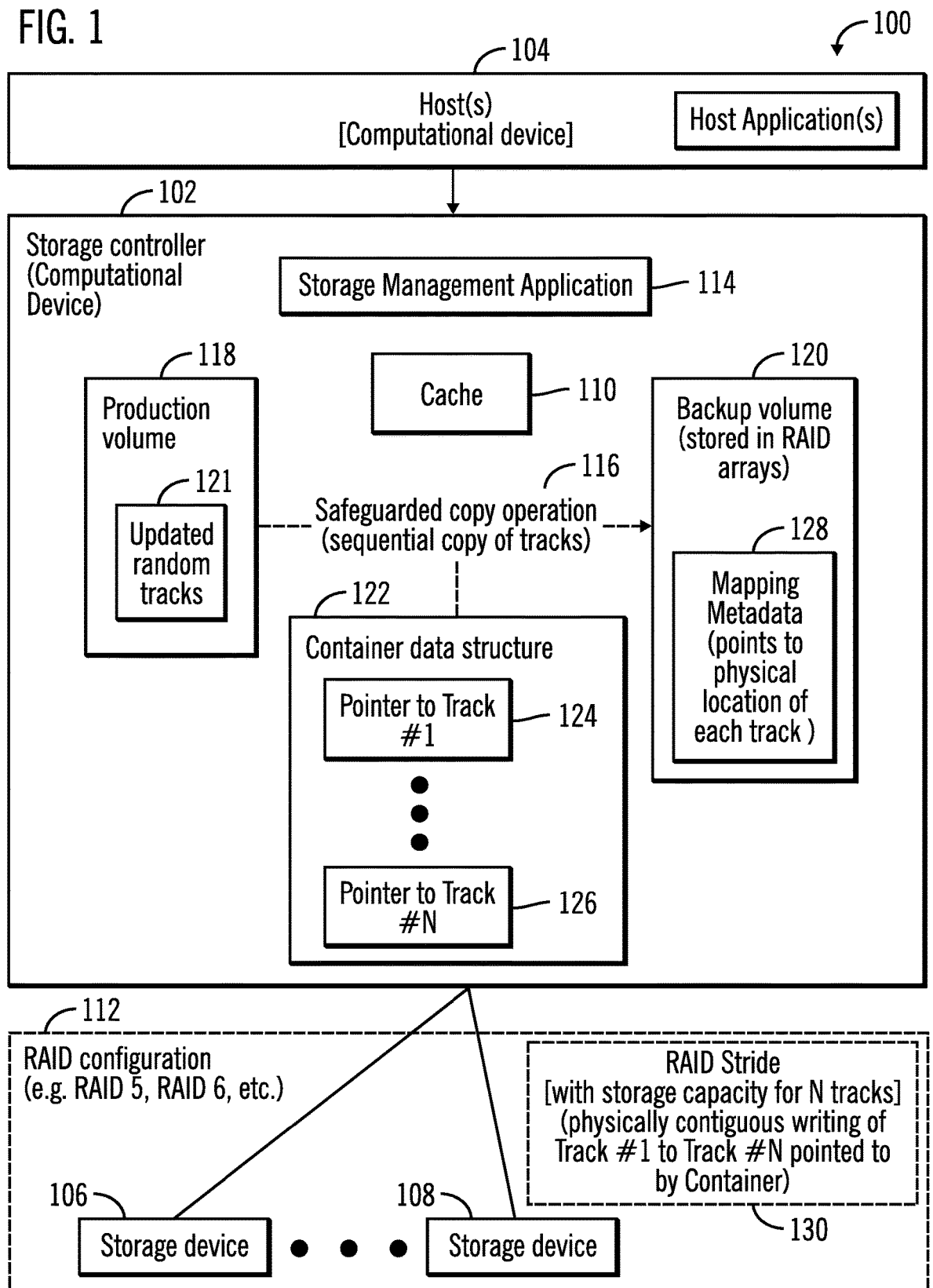
FIG. 1 illustrates a block diagram of a computing environment comprising a storage controller coupled to one or more hosts and one or more storage devices, in accordance with certain embodiments.

FIG. 1 illustrates a block diagram of a computing environment 100 comprising a storage controller 102 coupled to one or more hosts 104 and one or more storage devices 106, 108, in accordance with certain embodiments.

The storage controller 102 allows the one or more hosts 104 to perform input/output (I/O) operations with logical storage maintained by the storage controller 102. The physical storage corresponding to the logical storage may be found in one or more of the storage devices 106, 108 and/or a cache 110 of the storage controller 102.

The storage controller 102 and the hosts 104 may comprise any suitable computational device including those presently known in the art, such as, a personal computer, a workstation, a server, a mainframe, a hand held computer, a palm top computer, a telephony device, a network appliance, a blade computer, a processing device, a controller, etc. In certain embodiments, the storage controller 102 may be comprised of a plurality of servers. The plurality of servers may provide redundancy because if one server undergoes a failure from which recovery is not possible, an alternate server may perform the functions of the server that failed. Each of the plurality of servers may be referred to as a processing complex and may include one or more processors and/or processor cores. While FIG. 1 shows a single storage controller 102, in alternative embodiments the operations performed by the storage controller 102 may be performed by a plurality of storage controllers.

The storage controller 102 and the one or more hosts 104 may be elements in any suitable network, such as, a storage area network, a wide area network, the Internet, an intranet. In certain embodiments, storage controller 102 and the one or more hosts 104 may be elements in a cloud computing environment.

The plurality of storage devices 106, 108 may be comprised of any storage devices known in the art, such as solid state drives (SSD), hard disk drives (HDD), etc. A plurality of the storage devices 106, 108 may be maintained in a RAID configuration 112 (e.g., in a RAID 6 or some other RAID level).

A storage management application 114 may perform a safeguarded copy operation to perform a sequential copy of tracks from a production volume 118 to a backup volume 120. In certain embodiments, the storage management application 114 may be implemented in software, firmware, hardware, or any combination thereof.

In certain embodiments, tracks may be updated in a random order in the production volume 118, and these updated random tracks 121 are to be copied sequentially to the backup volume 120 via the safeguarded copy operation 116.

If each updated track is copied individually to the backup volume 120 then storing each updated track individually in a RAID stride requires reading old data and old parity and writing new data and new parity, and if many tracks are updated then this process is time consuming. Also writing to less than a full stride incurs a RAID penalty as described earlier. To improve this time consuming process, in certain embodiments, a container data structure 122 is maintained by the storage management application 114 while performing the safeguarded copy operations 116. The container data structure 122 is any suitable data structure known in the art, such as a list, a table, a set of entries, etc.

In certain embodiments, if the RAID stride 130 corresponding to the RAID configuration 112 has a storage capacity that holds N tracks (where N is a natural number, e.g., 1, 2, 3, etc.), then the container data structure 122 aggregates N tracks that are to be sequentially copied from the production volume 118 to the backup volume 120. The container data structure maintains N pointers 124, 126 to point to each of the N tracks. For example, in FIG. 1 reference numeral 124 shows a pointer that points to the first track of the N tracks, and reference numeral 126 shows a pointer that points to the last track of the N tracks.

In certain embodiments, once the container data structure 122 aggregates N tracks, then the N tracks are written to a single stride of the RAID configuration 112 by writing new data comprising data in the N tracks to the single RAID stride including updated parity. As a result, N tracks that are normally destaged in groups of less than a stride (i.e. tracks that are not logically contiguous) are destaged as a full stride group. As a result, the number of operations for writing to the storage drives is reduced.

The backup volume 120 maintains a mapping metadata 128 that points to the physical location of each track. As a result, logical tracks can be mapped to physical tracks stored in the single stride to which the N tracks of the container data structure 122 are written.

Therefore, FIG. 1, illustrates certain embodiments in which processing time (e.g., time for drive operations) needed for aggregating a plurality of tracks in a container data structure and storing the plurality of tracks physically contiguously in a single RAID stride is less than the time needed for storing each of the plurality of tracks individually in a plurality of RAID strides. The RAID penalty for writing to disks is reduced in such embodiments.

Figure 2:
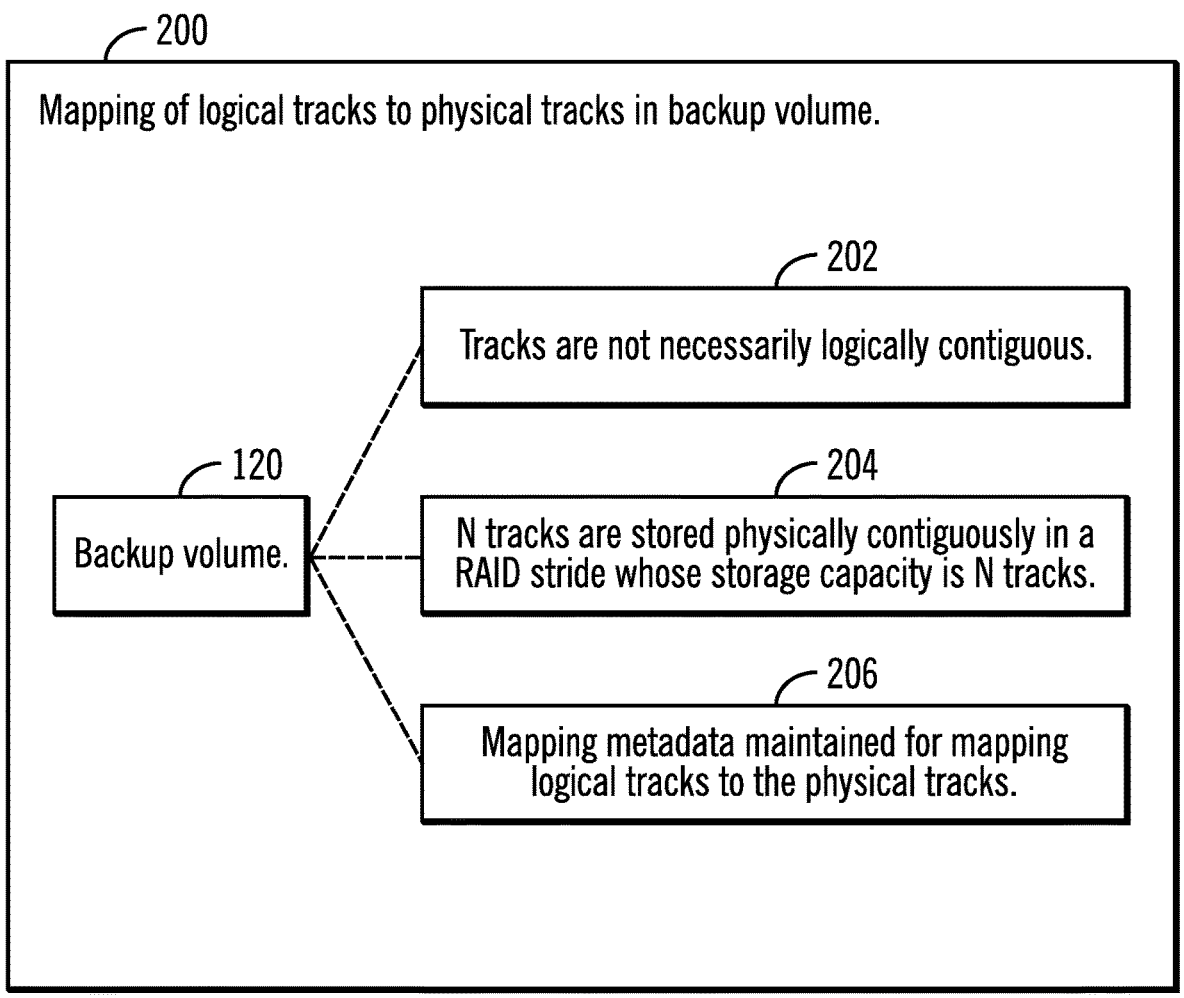
FIG. 2 illustrates a block diagram that shows the mapping of logical tracks to physical tracks in a backup volume, in accordance with certain embodiments.

FIG. 2 illustrates a block diagram 200 that shows the mapping of logical tracks to physical tracks in a backup volume 120, in accordance with certain embodiments.

Tracks in the backup volume 120 need not be logically contiguous (as shown via reference numeral 202). However, N such logically non-continuous tracks are stored physically contiguously in a single RAID stride whose storage capacity is N tracks (as shown via reference numeral 204), in accordance with the operations performed by the storage management application 114 for implementing the safeguarded copy operations 116. The backup volume 120 maintains mapping metadata for mapping the N non-contiguous logical tracks of the backup volume 120 to corresponding N physical tracks that are maintained contiguously in the single stride (as shown via reference numeral 206).

Figure 3:
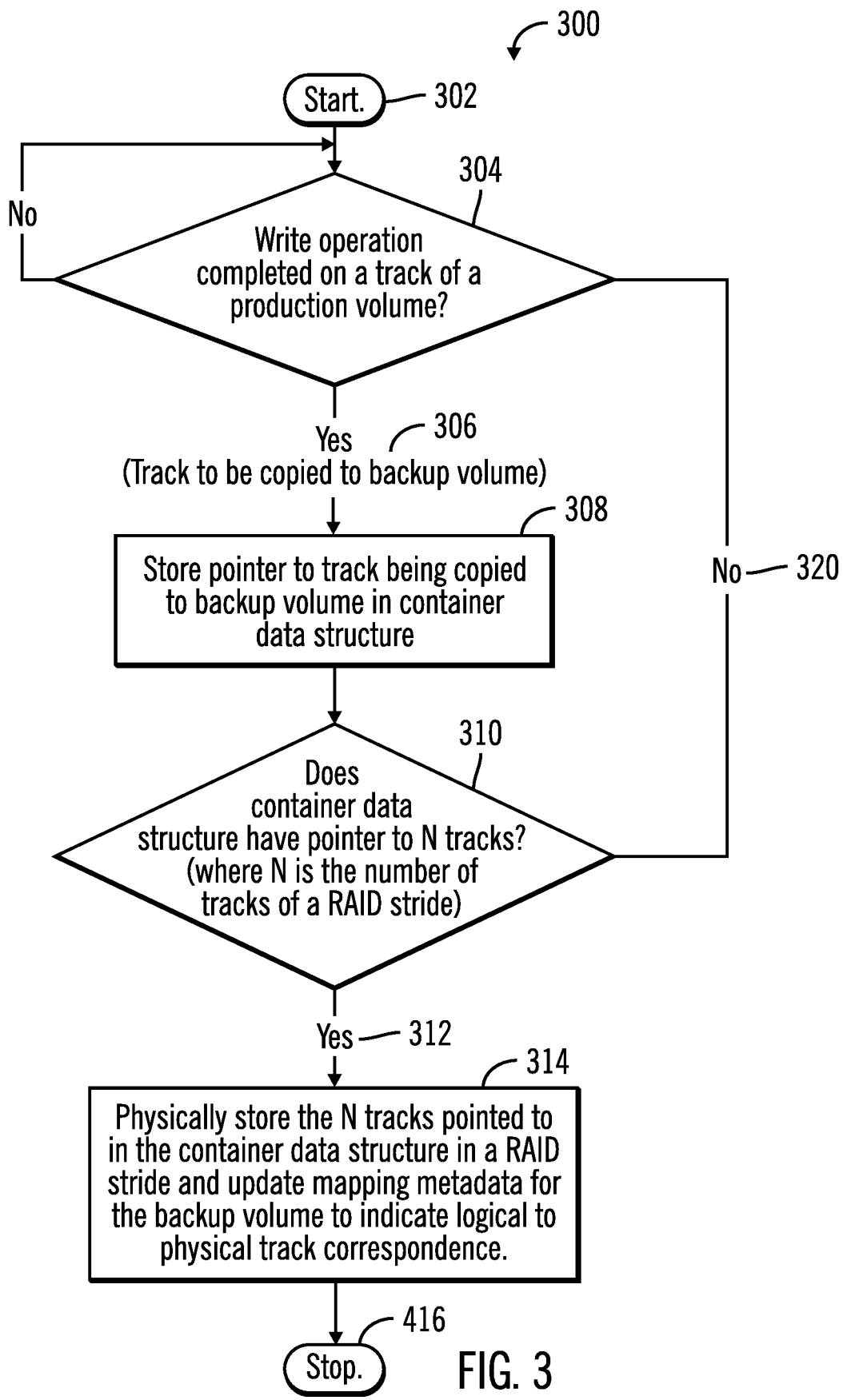
FIG. 3 illustrates a flowchart that shows how a container data structure is used to store pointers to a plurality of tracks to be copied from a production volume to a backup volume, in accordance with certain embodiments.

FIG. 3 illustrates a flowchart 300 that shows how a container data structure 122 is used to store pointers to a plurality of tracks to be copied from a production volume 118 to a backup volume 120, in accordance with certain embodiments. In certain embodiments, the operations shown in FIG. 3 may be performed by the storage management application 114 for performing the safeguarded copy operation 116.

Control starts at block 302 and proceeds to block 304 in which the storage management application 114 determines whether a write operation has been completed on a production volume 118. If so ("Yes" branch 306) then the track has to be copied to the backup volume 120 and the storage management application 114 stores (at block 308) a pointer to the track to be copied to the backup volume 120 in the container data structure 122.

From block 308 control proceeds to block 310 in which the storage management application 114 determines whether the container data structure 122 has pointers to N tracks (where N is the maximum number of tracks that a RAID stride can accommodate). If so ("Yes" branch 312), then the storage management application 114 physically stores the N tracks pointed to in the container data structure 122 by writing new data comprising data in the N tracks to a RAID stride including updated parity, and updates (at block 314) the mapping metadata 128 for the backup volume to indicate the logical to physical track correspondence, and the process stops (at block 416).

If at block 304, the storage management application 114 determines that a write operation has not been completed on a production volume 118 ("No" branch 318), the determination of block 304 is made once again. If at block 310, the storage management application 114 determines the container data structure does not have pointer to N tracks ("No" branch 320, i.e. N tracks have not been aggregated in the container data structure) then control returns to block 304.

Therefore, FIG. 3 illustrates aggregation of a plurality of tracks in a container data structure 122 to write new data comprising data in the plurality of tracks to a single RAID stride including updated parity. By aggregating the writing of the plurality of tracks to the single RAID stride, fewer drive operations are needed in comparison to writing each track as the track is copied to the backup volume 120.

Figure 4:
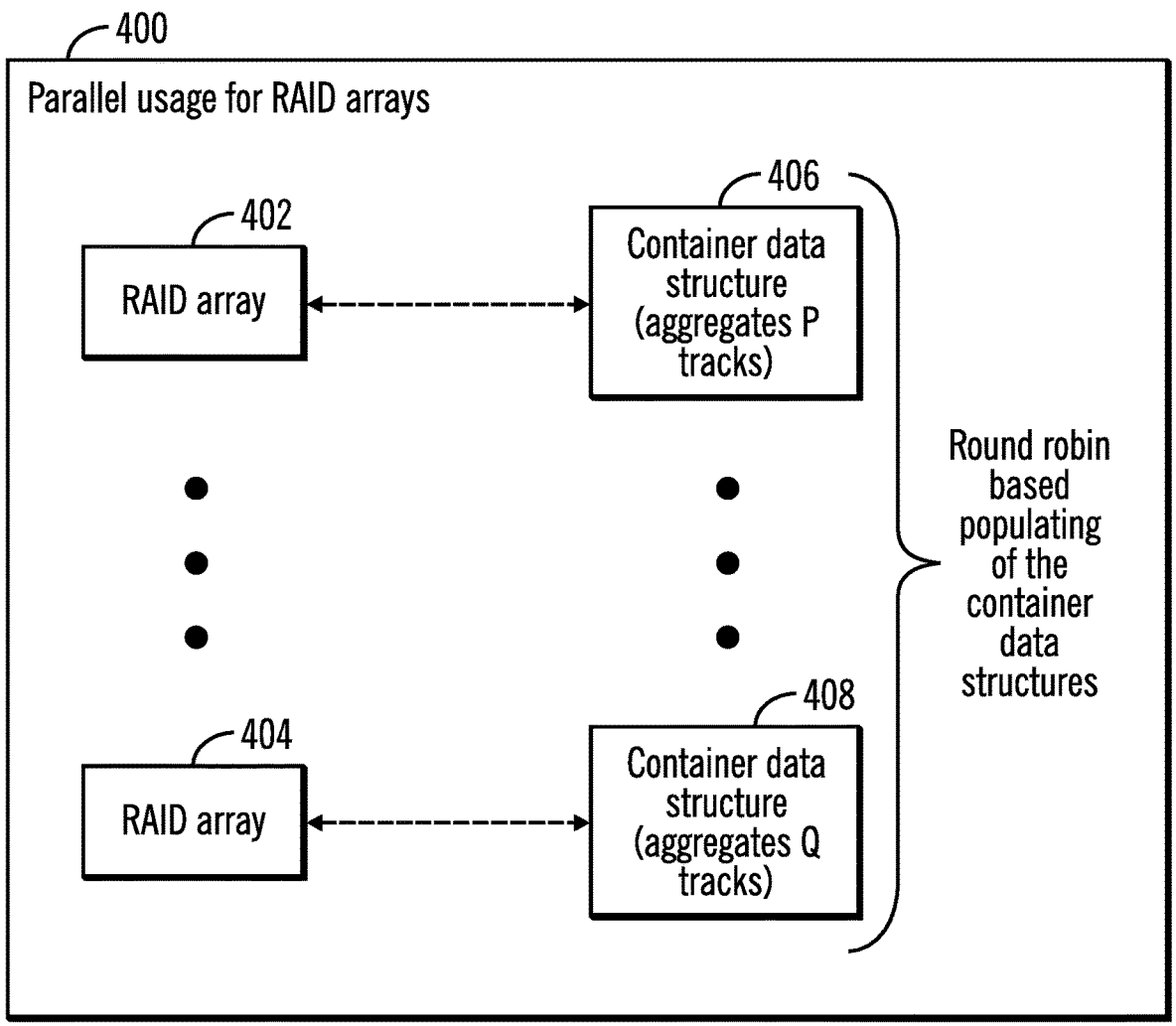
FIG. 4 illustrates a block diagram that shows a round robin based populating scheme for a plurality of container data structures corresponding to a plurality of RAID arrays, in accordance with certain embodiments.

FIG. 4 illustrates a block diagram 400 that shows a round robin based populating scheme for a plurality of container data structures corresponding to a plurality of RAID arrays, in accordance with certain embodiments.

In certain embodiments in which a plurality of RAID arrays 402, 404 are managed by the storage controller 102, the different RAID arrays may have strides that may accommodate a different number of tracks. For example, each stride of RAID array 402 may accommodate a maximum of P tracks, and each stride of RAID array 404 may accommodate a maximum of Q tracks. In such embodiments, a plurality of container data structures 406, 408 are maintained corresponding to the plurality of RAID arrays 402, 404. The container data structure corresponding to a RAID array aggregates the maximum number of tracks that the stride of the RAID array can accommodate. For example, the container data structure 406 corresponding to the RAID array 402 aggregates P tracks, and the container data structure 408 corresponding the RAID array 404 aggregates Q tracks.

In certain embodiments, the container data structures 406, 408 are selected for being populated with tracks via a round robin mechanism by the storage management application 114. For example, after the container data structure 408 is filled with a track then the next container data structure is filled with a track and so on. After the container data structure 408 is filled with a track, the container data structure 406 is filled with a track once again. In certain embodiments, the container data structures 406, 408 may be filled in parallel. Once a container data structure is filled to its capacity, the tracks of the container data structure are physically written to a single stride of the corresponding RAID array. As a result, the processing speed for performing safeguarded copy operations is increased. It should be noted that many different types of round robin schemes may be employed to populate the container data structures 406, 408.

Figure 5:
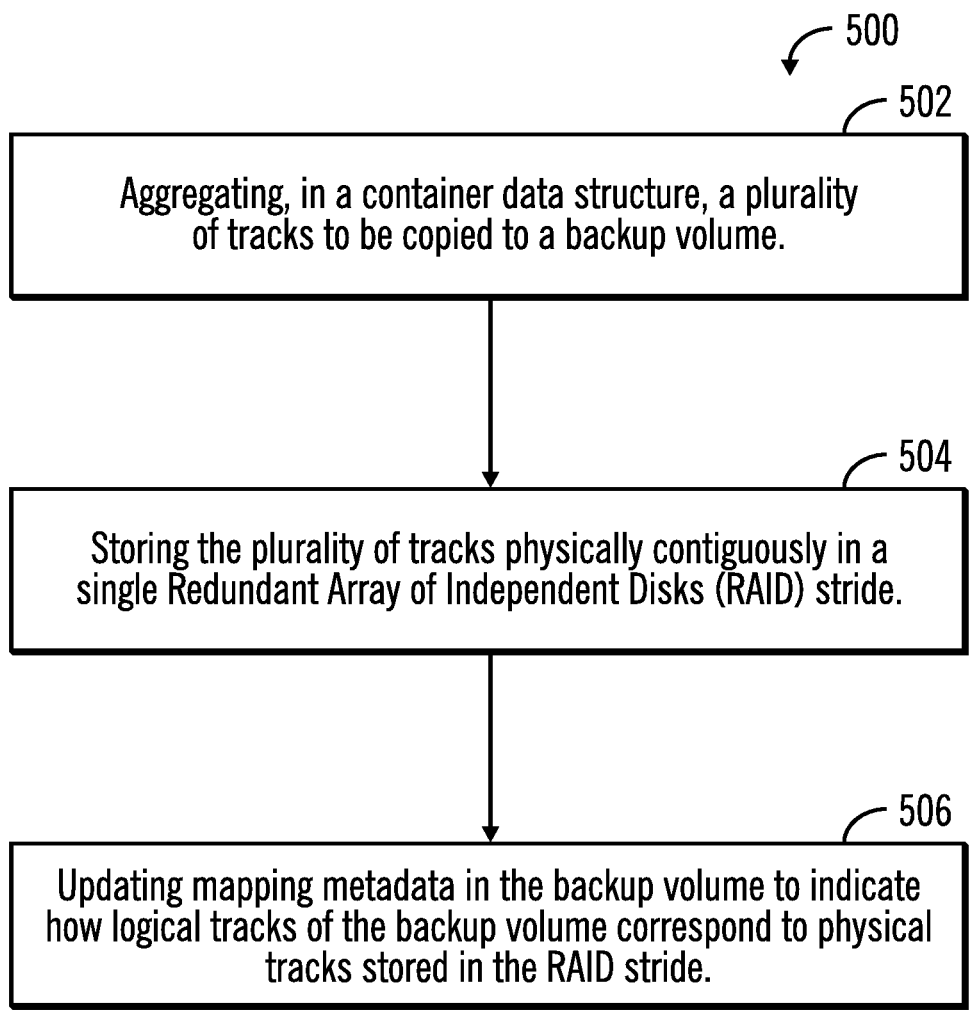
FIG. 5 illustrates a flowchart that shows the aggregation of tracks to be copied to a backup volume for physically contiguous storage on a Redundant Array of Independent Disks (RAID) stride, in accordance with certain embodiments.

FIG. 5 illustrates a flowchart 500 that shows the aggregation of tracks to be copied to a backup volume 120 for physically contiguous storage on a Redundant Array of Independent Disks (RAID) stride 130, in accordance with certain embodiments. In certain embodiments, the operations shown in FIG. 3 may be performed by the storage management application 114 for performing the safeguarded copy operation 116.

Control starts at block 502 in which a plurality of tracks that are to be copied to a backup volume 120 are aggregated in a container data structure 122. The plurality of tracks are stored (at block 504) physically contiguously in a single Redundant Array of Independent Disks (RAID) stride 130.

Mapping metadata 128 is updated (at block 506) in the backup volume 120 to indicate how logical tracks of the backup volume 120 correspond to physical tracks stored in the RAID stride 130. The plurality of tracks aggregated in the container data structure 122 is numerically equal to a maximum number of tracks that can be stored in the RAID stride 130.

Therefore, FIGS. 1-5 illustrate certain embodiments in which by storing N tracks in a container data structure (where N is the maximum number of tracks that a single RAID stride can accommodate), and then aggregating the writing of the N tracks physically contiguously to a single RAID stride, the number of drive operations are reduced in comparison to situations in which each track is individually written as and when tracks are copied to the backup volume.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 6:
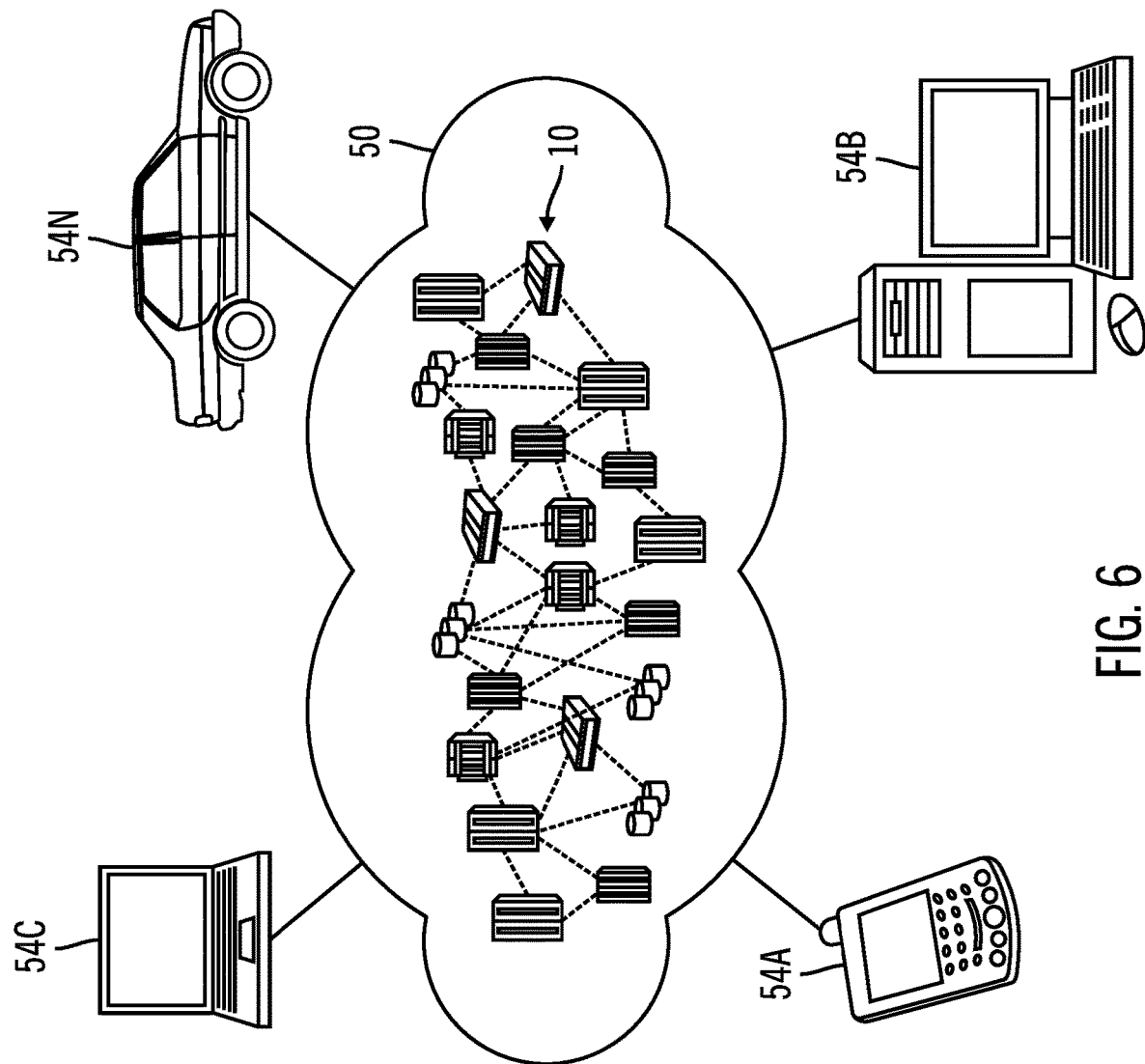
FIG. 6 illustrates a block diagram of a cloud computing environment, in accordance with certain embodiments.

Referring now to FIG. 6 an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 7:
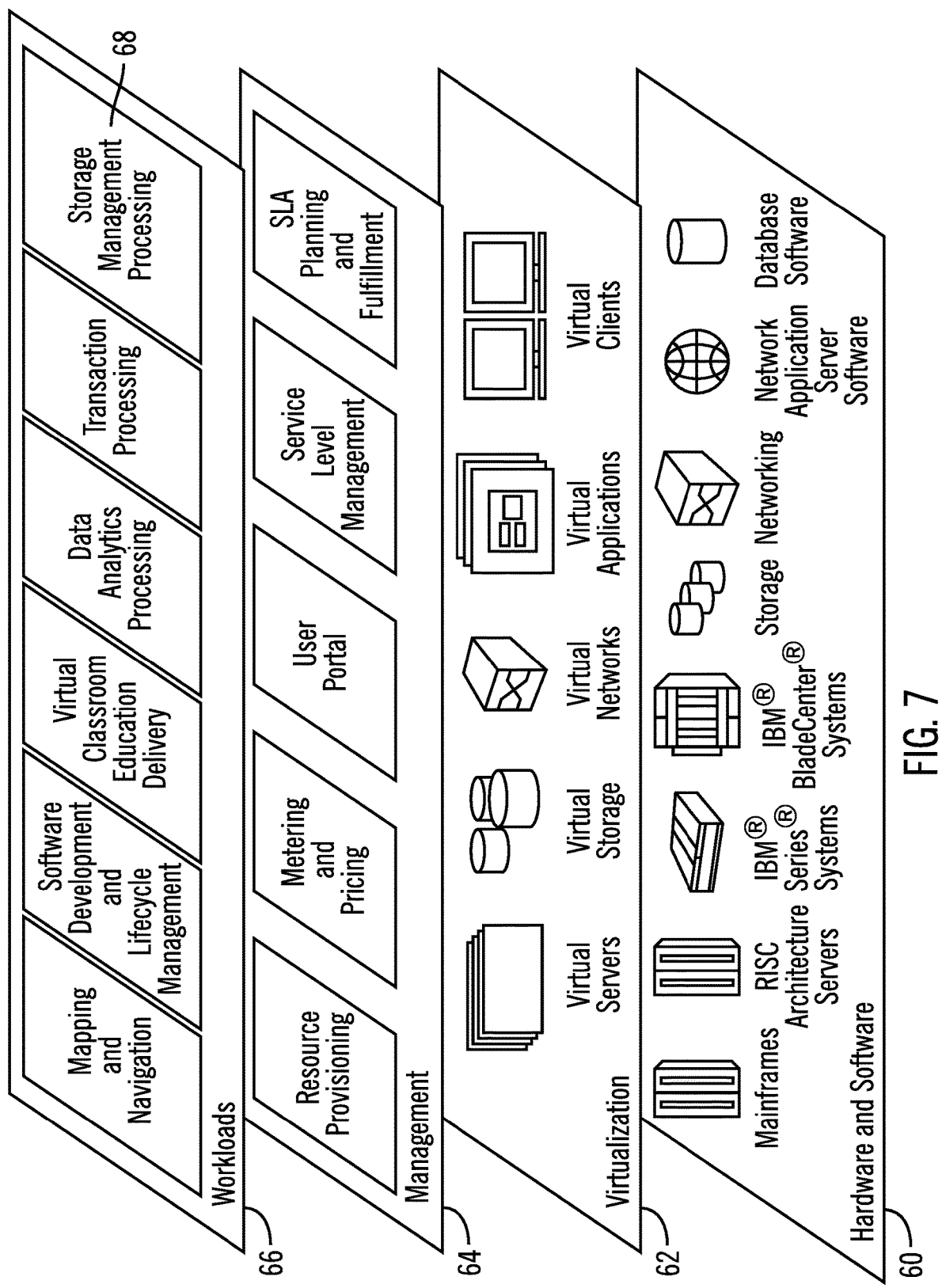
FIG. 7 illustrates a block diagram of further details of the cloud computing environment of FIG. 6 in accordance with certain embodiments.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

*IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and storage management processing 68 as shown in FIGS. 1-5.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit." "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 8:
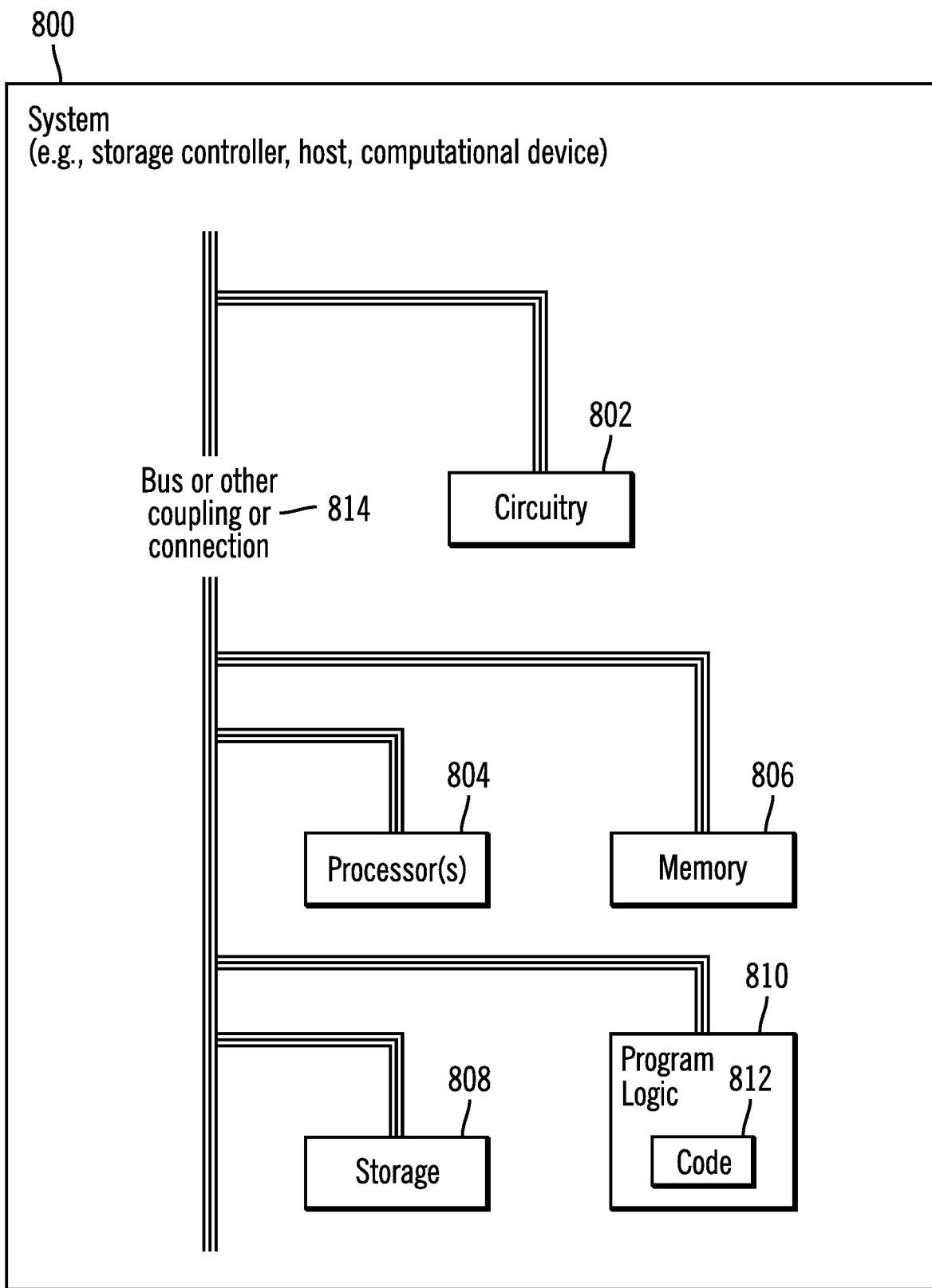
FIG. 8 illustrates a block diagram of a computational system that shows certain elements that may be included in the storage controller or the host, as described in FIG. 10, in accordance with certain embodiments.

FIG. 8 illustrates a block diagram that shows certain elements that may be included in the storage controller 102 or the host 104, or other computational devices in accordance with certain embodiments. The system 800 may include a circuitry 802 that may in certain embodiments include at least a processor 804. The system 800 may also include a memory 806 (e.g., a volatile memory device), and storage 808. The storage 808 may include a non-volatile memory device (e.g., EEPROM, ROM, PROM, flash, firmware, programmable logic, etc.), magnetic disk drive, optical disk drive, tape drive, etc. The storage 808 may comprise an internal storage device, an attached storage device and/or a network accessible storage device. The system 800 may include a program logic 810 including code 812 that may be loaded into the memory 806 and executed by the processor 804 or circuitry 802. In certain embodiments, the program logic 810 including code 812 may be stored in the storage 808. In certain other embodiments, the program logic 810 may be implemented in the circuitry 802. One or more of the components in the system 800 may communicate via a bus or via other coupling or connection 814. Therefore, while FIG. 8 shows the program logic 810 separately from the other elements, the program logic 810 may be implemented in the memory 806 and/or the circuitry 802.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article may be used in place of a single device/article. Similarly, where more than one device or article is described herein, it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   aggregating, in a container data structure, a plurality of tracks to be copied to a backup volume;
   storing the plurality of tracks physically contiguously in a single Redundant Array of Independent Disks (RAID) stride; and
   updating mapping metadata in the backup volume to indicate how logical tracks of the backup volume correspond to physical tracks stored in the RAID stride.

2. The method of claim 1, wherein the plurality of tracks aggregated in the container data structure is numerically equal to a maximum number of tracks that can be stored in the RAID stride.

3. The method of claim 2, wherein the storing of the plurality of tracks in the RAID stride comprises:
   writing new data comprising data in the plurality of tracks to the RAID stride including updated parity.

4. The method of claim 3, wherein processing time needed for aggregating the plurality of tracks and storing the plurality of tracks physically contiguously in the single RAID stride is less than the time needed for storing each of the plurality of tracks individually in a plurality of RAID strides via a plurality of operations that each comprise reading old data and old parity and writing new data and new parity.

5. The method of claim 1, wherein tracks are updated randomly on a production volume from which tracks are copied to the backup volume, and wherein copying of the tracks that are updated on the production volume are performed sequentially to the backup volume.

6. The method of claim 1, the method further comprising:
   maintaining a plurality of container data structures for a plurality of RAID arrays, wherein each container data structure stores tracks corresponding to a stride of a RAID array, and wherein at least two container data structures aggregate a different number of tracks.

7. The method of claim 6, wherein the plurality of container data structures are populated with tracks via a round robin mechanism.

8. A system, comprising:
   a memory; and
   a processor coupled to the memory, wherein the processor performs operations, the operations comprising:
      aggregating, in a container data structure, a plurality of tracks to be copied to a backup volume;
      storing the plurality of tracks physically contiguously in a single Redundant Array of Independent Disks (RAID) stride; and
      updating mapping metadata in the backup volume to indicate how logical tracks of the backup volume correspond to physical tracks stored in the RAID stride.

9. The system of claim 8, wherein the plurality of tracks aggregated in the container data structure is numerically equal to a maximum number of tracks that can be stored in the RAID stride.

10. The system of claim 9, wherein the storing of the plurality of tracks in the RAID stride comprises:
    writing new data comprising data in the plurality of tracks to the RAID stride including updated parity.

11. The system of claim 10, wherein processing time needed for aggregating the plurality of tracks and storing the plurality of tracks physically contiguously in the single RAID stride is less than the time needed for storing each of the plurality of tracks individually in a plurality of RAID strides via a plurality of operations that each comprise reading old data and old parity and writing new data and new parity.

12. The system of claim 8, wherein tracks are updated randomly on a production volume from which tracks are copied to the backup volume, and wherein copying of the tracks that are updated on the production volume are performed sequentially to the backup volume.

13. The system of claim 8, the operations further comprising:
maintaining a plurality of container data structures for a plurality of RAID arrays, wherein each container data structure stores tracks corresponding to a stride of a RAID array, and wherein at least two container data structures aggregate a different number of tracks.

14. The system of claim 13, wherein the plurality of container data structures are populated with tracks via a round robin mechanism.

15. A computer program product, the computer program product comprising:
a computer readable storage medium having computer readable program code embodied therewith, the computer readable program code configured to perform operations on a processor, the operations comprising:
aggregating, in a container data structure, a plurality of tracks to be copied to a backup volume;
storing the plurality of tracks physically contiguously in a single Redundant Array of Independent Disks (RAID) stride; and
updating mapping metadata in the backup volume to indicate how logical tracks of the backup volume correspond to physical tracks stored in the RAID stride.

16. The computer program product of claim 15, wherein the plurality of tracks aggregated in the container data structure is numerically equal to a maximum number of tracks that can be stored in the RAID stride.

17. The computer program product of claim 16, wherein the storing of the plurality of tracks in the RAID stride comprises:
writing new data comprising data in the plurality of tracks to the RAID stride including updated parity.

18. The computer program product of claim 17, wherein processing time needed for aggregating the plurality of tracks and storing the plurality of tracks physically contiguously in the single RAID stride is less than the time needed for storing each of the plurality of tracks individually in a plurality of RAID strides via a plurality of operations that each comprise reading old data and old parity and writing new data and new parity.

19. The computer program product of claim 15, wherein tracks are updated randomly on a production volume from which tracks are copied to the backup volume, and wherein copying of the tracks that are updated on the production volume are performed sequentially to the backup volume.

20. The computer program product of claim 15, the operations further comprising:
maintaining a plurality of container data structures for a plurality of RAID arrays, wherein each container data structure stores tracks corresponding to a stride of a RAID array, and wherein at least two container data structures aggregate a different number of tracks, wherein the plurality of container data structures are populated with tracks via a round robin mechanism.

* * * * *